Figure 1:
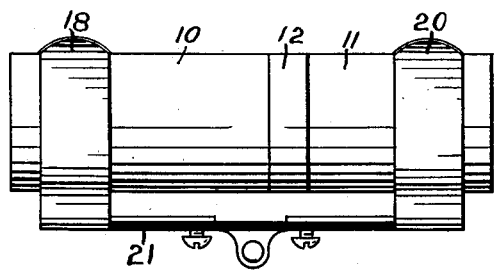

April 25, 1933.  J. H. STALEY  1,906,118

MERCURY SWITCH

Filed Dec. 24, 1932

Inventor,
Joseph H. Staley,
By *Minturn & Minturn,*
Attorneys.

Patented Apr. 25, 1933

1,906,118

UNITED STATES PATENT OFFICE

JOSEPH H. STALEY, OF COLUMBUS, INDIANA

MERCURY SWITCH

Application filed December 24, 1932. Serial No. 648,749.

This invention relates to means for making and breaking electrical circuits such as are employed in electrically operated signs, refrigerators, oil burning devices, household lighting and many other applications. In particular, the invention relates to that type of a switch commonly referred to as a mercury tube switch wherein a body of mercury is caused to travel in a tube to between electrodes and form a bridge thereacross to close the circuit and to travel in an opposite direction to remove the bridge therebetween by tilting or rocking the tube. I am aware of prior attempts to produce a workable tube of this type employing glass as the material from which the tube was made wherein electrical conductors were required to be passed through the glass material, which structure required some form of a sealing means to prevent atmospheric gases from entering the tube and reaching the mercury therewithin. The difficulties with mercury switches employing glass walls as heretofore made are many. One of the greatest objections has been that the tube is exceedingly fragile, must be amply guarded, and often breaks even under the impact of the mercury within it as the mercury may be shifted violently from one end to the other. A serious objection has been that heavy over-loads on tubes of types previously employed have frequently rendered them inoperative. Another difficulty was found in the fact that pigtail connections were required to extend from the tube itself making installation difficult, and further that the tube must be held in a certain position insofar as its axial rotation was concerned. In short, the glass tube type of mercury switches heretofore employed have had exceedingly short life, have been expensive to maintain on account of breakage, expensive to make and were not of such a structure which would permit them to be used under a wide range of applications.

Extensive experimentation has disclosed to me that theories advanced hertofore as to the required structural and material formation of glass tube mercury switches are not used in actual practice. Working upon an entirely different theory, I have produced a mercury tube switch which avoids these difficulties heretofore encountered as above indicated, and one particular form of my invention will be hereinafter disclosed.

The first and primary object of my invention is to provide a tube that is unbreakable whereby the field for use of mercury tubes is immediately broadened so that the tubes may be employed in many installations where the fragile glass tubes were not to be considered. The invention has a further safety factor in installations where the tubes are exposed to explosive gases and dusts where a single spark would be fatal. Another very important feature of my invention is that its embodiment lends itself to far cheaper production than does the glass tube and that it can be clipped into position instantly regardless of its axial rotation and without the necessary delay of attaching pigtail connections.

My invention provides a structure adapted to automatic machine production thereby permitting a low cost of manufacture. Further, the structure I have devised is well adapted to automatic machine filling as relating to the exchange of gases and also to the quantity of mercury employed in the tube.

In general, my invention embodies a metallic tube and an enclosing metallic cap with a non-deteriorating insulating medium between these two elements so arranged that an electrical circuit may be made by a body or globule of mercury extending over the insulating medium from the wall of the tube to the wall of the cap. There are no protruding electrodes projecting to within the tube so that this completing of the electrical circuit may be made at any axial angle of rotation of the tube. Particular stress is to be laid upon the method of assembling this structure and the materials employed. The mercury itself must have a higher degree of purity and freedom from foreign matter than is found in the ordinary commercial form. Special cleaning and redistilling is required to remove contaminating elements. Care must be exercised during the manufacture of the tube in the handling of component parts to keep them clean. All traces of oil must be particularly avoided. It is essential that nothing come in contact with the pure mercury which will alter its inherent surface tension. I have conducted experiments over an extended length of time in which I have used various metals and alloys from which the tube and cap have been made.

In one form of tube, I make the tube body and cap from a relatively pure iron within the range of the commercially obtainable iron, and obtain a switch that has a long life far exceeding that of the glass tube types heretofore developed. One particular analysis of iron employed includes in addition to the iron content, carbon not to exceed .012 percent, manganese .018 percent, sulphur .023 percent, phosphorous .004 percent and silicon .003 percent. This material has both a greater heat and electrical conductivity than does mild steel. The iron is a dense, ductile and uniform metal.

The atmospheric gases within the tube are replaced with an inert gas. By inert gas, I mean any gas not having a deteriorating effect on the mercury. Hydrogen gas is indicated because it is available commercially at a low cost and with a high degree of purity. Particular attention is directed to the fact that in my practice, I do not so evacuate the tube that a difference in excluded and included pressures is set up. Instead I evacuate from both inside and outside surfaces or displace the air therewithin without setting up any difference in pressure on the tube and cap as between the inner and outer surfaces of their walls so that whatever occluded gases are initially in these parts they remain there without any tendency to flow toward either surface. The displacement of the air may be brought about by immersing the parts in a bath of mercury so as to completely submerge them and have the air replaced by the mercury itself. The parts thus submerged are subjected to the selected gas under pressure and the mercury poured out of the cap and tube body in the presence of this gas, the cap being emptied and just that amount of mercury left in the tube body which is required to bridge over the insulating medium when the cap is assembled with the body so as to complete the electrical circuit therebetween. The cap is placed over the open end of the tube body and sealed into position while these elements are still subjected to the gas pressure so that there is a pressure of the gas within the finished tube above atmospheric pressure. As to the method of filling the tube, reference is made to my copending application for U. S. Letters Patent filed May 31, 1932, Serial No. 614,462.

My invention contemplates the use of a di-electric material inserted between the cap and tube body at the point where arcing occurs as the bridge of mercury between the tube body and cap is broken and further contemplates the forming of the element made of this material to have a shape adapted to accelerate the breaking of the mercury bridge as well as to give a quenching effect on the arc set up at the time of breaking. There is further incorporated in the invention the principle of quenching the arc by reason of differences in pressure set up immediately adjacent the arcing area. The body of mercury is itself separated into two masses to interrupt the current flow rather than having the interruption occur between the mercury and the metallic members. Such a di-electric material is employed as does not contaminate the mercury, as will withstand the high heat of the arc, and as will protect the other tube parts from deteriorating effects of the arc.

The di-electric member above indicated must be made out of some material which will withstand the intense heat of the arc. This material may be a fused silica mixture which can be had in a number of forms, one suitable mixture having as its principal ingredients, in approximate proportions, silica 49.97 per cent; magnesia 44.62 per cent; and iron 3.44 per cent. The mixture is fused at approximately 2000 degrees F. Soapstone, lava, and molded asbestos compositions may be employed. Such materials are hard, but may be broken under heavy impacts, and my invention includes means for mounting this di-electric member in a cushioned relation as between it and the tube wall. I obtain a very rapid transmission of heat from the arcing area within the tube through the metallic tube wall so as to dissipate this heat within the atmosphere. This factor of rapid heat dissipation is important.

Within my invention is included means between the tube and cap which not only insulates the two parts one from the other but serves as a gas sealing medium as well as a cushion for the above indicated di-electric member. This means, hereinafter referred to as a bushing, must be of non-deteriorating material, relatively soft but resilient, have no contaminating effect on mercury, be capable of being machined, and adapted to withstand relatively high temperatures. The analysis of one particular material I have found to be suitable is a vulcanized fiber composed of approximately 93 per cent cellulose and cellulose derivatives, 6 per cent water, and 1 per cent ash containing .03 per cent silica and .07 per cent chlorides, sulphates, iron, zinc, calcium and magnesium. Among other suitable materials are rubber and molded asbestos.

The various elements entering into the finished switch are easily adapted to rapid production by automatic machines both in the forming of the parts as well as in their assembly so that the manufacturing method may be so set up as to eliminate many hand operations. This result is further facilitated by the use of the particular materials herein specified as will hereinafter be explained more in detail.

Figure 2:
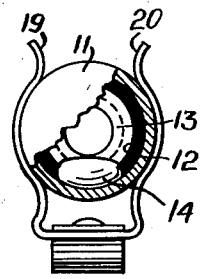
Figure 3:
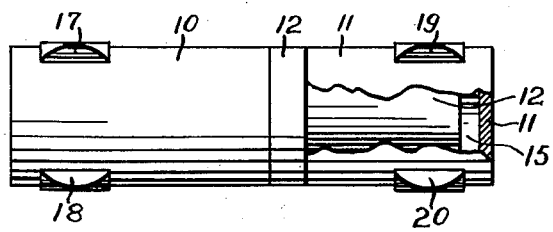
Figure 4:
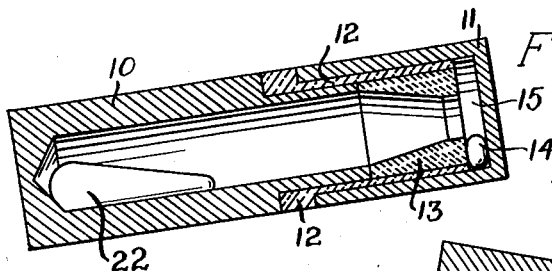
Figure 5:
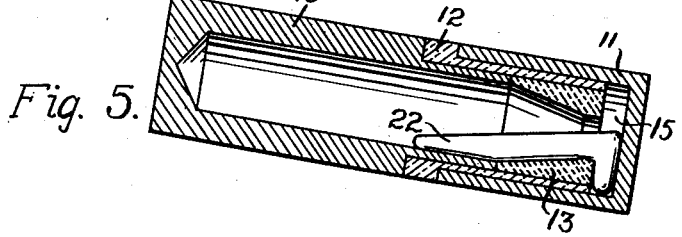
Figure 6:
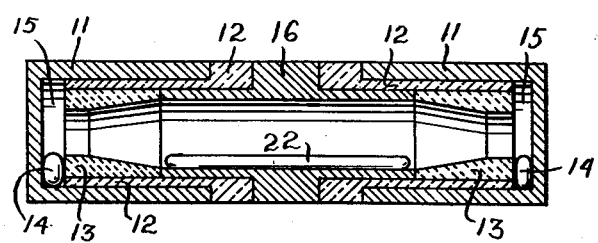

One particular form of my invention which extended use has found to be exceedingly successful is illustrated in the accompanying drawing, in which Fig. 1 is a side elevation of a switch structure embodying my invention;

Fig. 2, a fragmentary end elevation;

Fig. 3, a fragmentary top plan view;

Fig. 4, a central longitudinal section through the switch tube with the tube rocked to an "off" position;

Fig. 5, a similar longitudinal section with the tube rocked to the "closed" position;

Fig. 6, a modified form of the tube adapted to operate in two circuits.

Like characters of reference indicate like parts in the several views in the drawing.

I form a tubular body 10, made from metal, to have one end integrally closed and the other end open. For a short distance back from this open end, the external diameter of the tube is reduced. A cap 11 is formed from metal, here shown as having the same external diameter as that of the main portion of the body 10, but has an internal diameter exceeding the external diameter of the reduced end of the body.

A bushing 12, preferably made from the material above indicated is formed to have an internal bore slightly less in diameter than the diameter of the reduced portion of the body 10. The bushing is also formed to have an external diameter of its major length slightly exceeding the internal diameter of the cap 11. One end of the bushing is formed to leave a collar to have an external diameter equal to that of the outside of the tube and cap. A breaker 13, referred to above as a di-electric member, is formed to have an external diameter slightly greater than the internal diameter of the bushing 12. Particular attention is directed to the internal opening through this breaker. A central conical bore is formed in the breaker to extend through the major portion axially thereof with the smaller end of the bore opening into a short cylindrical bore immediately at one end of the breaker. The large end of the conical bore is at the opposite end of the breaker.

The bushing 12 is forced into the cap 11 to have the open end of the cap abut the bushing collar. The breaker 13 is pressed down through the bushing 12 with its cylindrical bore end directed toward the closed end of the cap, and is finally positioned to have that end flush with the end of the bushing 12.

It is to be understood that the body 10 and cap 11 have been thoroughly cleansed to remove all traces of oil or cutting compounds as may have been employed while they were being formed. All parts are kept scrupulously clean and close tolerance of machine operations have been maintained with particular attention being given to provide smooth surfaces, especially that of the inside wall of the cap 11 and the surface about the outer side of the reduced portion of the body 10.

Under the displacement method, the tube body 10 and the cap 11, with the bushing 12 and breaker 13 assembled therein as above indicated, are submerged in separated relation in a bath of mercury, the purity of which has been closely guarded so as to prevent the occurrence of any contaminating materials. The tube body and cap are submerged in such a manner as to allow the escape therefrom of the air so that the mercury may completely fill all of the space in each of the two parts. This air is allowed to escape freely from the mercury. The body 10 and cap 11 thus submerged are shifted in the bath to under a bell containing the selected gas, such as hydrogen gas of a high degree of purity. The hydrogen gas is present in this bell under a pressure above atmosphere ranging from two to five pounds thereabove, the important requirement here being that the hydrogen gas be under pressure exceeding atmospheric pressure. Under this bell, the cap and body are relatively raised from the bath of mercury in such a manner that as the mercury flows out of the two parts, hydrogen gas may flow therein. The cap 11 is tilted so that all of the mercury may flow thereout with the possible exception of a globule 14 which may remain between the breaker 13 and the end of the cap 11. The body 10 is so manipulated that a larger body of mercury will be retained in it of a definite quantity, predetermined in advance, sufficient for operation in the finished switch. With the tube and cap thus having hydrogen under pressure replace the emptied-out mercury, the reduced portion of the tube body 10 is inserted to within the bushing 12 and the cap and body then forced together to carry the reduced portion of the body entirely within the bushing and have the shoulder at the end of the larger diameter of the body compressively abut the outer end of the bushing. Thus hydrogen gas is sealed within the cap and tube under pressure above atmospheric. The tube thus formed is then removed from under the bell and is ready for testing and use.

The various parts of the tube are so proportioned that a chamber 15 is left between the ends of the bushing 12 and breaker 13 and the cap end, from which chamber an escape is provided through the cylindrical bore of the breaker 13 continuing through the conical bore and then into the bore of larger volume within the body 10. The internal wall of the bushing 12 is completely covered over by the breaker 13 and the reduced portion of the body 10, both of which compressively force the bushing against the inside wall of the bore of the cap 11. The fit between these members as affecting the compression of the bushing 12 is held within close limits so that the bushing material is actually compressed to fill all uneven surfaces as may have resulted in the machining of the body and cap. It is to be noted that only the extreme end of the bushing as presented in the chamber 15 is exposed to possible contact with the mercury. In practice the external diameter of the breaker 13 is slightly less than the external diameter of the reduced portion of the body 10 so that after the breaker is forced in position, the reduced portion of the body 10 following thereafter will cause a greater pressure to be exerted against the bushing. The bushing presents a cushion between the breaker and the cap wall.

In the form of tube as indicated in Fig. 6, the cap assembly including a bushing and breaker is duplicated on both ends of a central body 16, the body in this case having a reduced portion at each end thereof to compressively fit within the bushings carried in the cap ends, this form being shown to indicate one of the possible modifications of the structure wherein one tube may handle two circuits.

Following the assembly of the component parts as above indicated, the tube is preferably treated externally to produce a rust resisting surface. The assembled tube is carefully tested. It is preferably mounted between spring clips 17, 18 engaging the metallic wall of the tube by one end and 19, 20 engaging the metallic wall at the other end to have the exposed collar of the bushing 12 between those two sets of clips. These clips are carried on any suitable base 21, here shown as a strip of insulating material which may be rocked to correspondingly rock the tube. Current of considerable amperage is then applied to the clips through the two ends of the tube and the tube is tilted or rocked a number of times to determine the characteristics of the tube in order to determine whether or not the preceding operations have been correct in all details. Tests have been conducted over long periods of time and after intervals of rest, in which tests, currents of two to three times the normal carrying capacity of the tube have been passed through the switch and made and broken at a high frequency without destroying the perfect functioning of the tube. All tubes must pass the test without any "flicker" in the breaking or making of the circuit and the tubes must not become unduly heated under such a series of rapidly succeeding cycles of making and breaking of the circuit.

Particular attention is directed to the movement of the mercury in relation to the structural formation of the tube as the tube is rocked through its cycle of operation. Referring to Fig. 4 a globule 14 of mercury is left within the chamber 15 either at the time of filling the tube with gas or after the initial rocking of the tube to the closed-circuit position. The main mass or body 22 of mercury is such that when the tube is rocked to the "off" position as indicated in Fig. 4, this mass is entirely in contact with the body 10 and removed somewhat back of the breaker 13. As above indicated it is highly important that all the materials be so selected that this mass of mercury will retain its inherent original surface tension even after repeated subjection to arcing so that the mass will be exceedingly mobile in flowing throughout the length of the body 10. Even slight contamination of the mercury affects this surface tension such that there will be a tendency for the mercury to adhere to the metal wall of the tube thereby materially affecting the behavior of flow of the mass. Now when the tube is rocked to close the circuit as in Fig. 5, this mass of mercury 22 will assume some such form as there indicated whereby the mercury will flow over the breaker 13 to coalesce with the globule 14 and still have an appreciable portion in contact with the body 10, the portion over the breaker having a sufficient cross-sectional area to conduct the given current flow without heating. The circuit is then made between the cap 11 through the mercury over the breaker 13 and the body 10. The quantity of mercury is predetermined to be such and the degree of rocking of the tube is likewise predetermined so that in the closed circuit position, the mercury, extending through the cylindrical bore of the breaker 13, does not completely fill that bore but leaves a small opening above the mercury.

Now as the tube is rocked from the position indicated in Fig. 5 toward that indicated in Fig. 4, the cohesion and surface tension of the mass of mercury will tend to cause it to remain for an interval in the position shown in Fig. 5, but as the rocking continues, the breaker 13 is lifted to present a downward slope away from the cylindrical bore therethrough tending to aid in the breaking of the mercury into two masses over the edge presented in the cylindrical bore, and this slope thus presented further aids in accelerating the flow of mercury away from this point of breakage even before the bore of the body 10 is rocked around beyond its horizontal position. The breaker itself is relatively raised through the mercury to shear it over the breaker edge. By reason of the peculiar construction of the breaker 13, the break between the two masses of mercury, that is, between the globule 14 left in the chamber 15 and the remaining mass 22, occurs within the very short length of the cylindrical bore in the breaker and this bore is at the mouth of the opening from the relatively small chamber 15.

It is apparent from the above description that the flow of current is broken not between iron and mercury but between two masses of mercury separating one from the other, and also that what arcing occurs is present not over iron surfaces but over the breaker 13 which is made out of a material previously selected to remain inert and unaffected by such electrical discharges. It is pertinent to note that while the breaker 13 may be subjected to relatively high temperatures set up by the arc, the breaker 13 may expand and contract by reasons of its being supported and maintained in position by frictional, compressive contact with the bushing 12. Heat is readily dissipated by conductivity through the gases and moving mercury, as well as by radiation, through the metallic walls of the body 10 and the cap 11, both of which have a rather high thermal conductivity. Thus, even though the tube may be oscillated very rapidly and high amperages employed, heat within the tube cannot become excessive by reason of the conductivity of the tubular walls and the radiating surfaces.

An advantage of my invention that should not be overlooked is that this structure having the metallic walls may be employed in making or breaking circuits without serious interference in nearby radio circuits since the tube is in effect a shield. The tube may be placed between clips at any degree of annular rotation about its axis without in any way affecting its operation. It may be dropped on cement floors and subjected to like impacts without any danger of breakage. The only breakable element is the breaker and it is thoroughly cushioned against outside blows.

I claim:

1. In a mercury switch, the combination of a metallic container constituting one electrode of the switch, a second electrode operatively associated therewith, an insulating member characterized by resilience and compressibility separating said container and electrode and forming a seal therewith, a mass of mercury shiftable to make and break the circuit between said container and electrode, and an insert over which the circuit is made and broken carried by said member.

2. In a mercury switch, the combination of a metallic tube closed at one end, a metallic cap for closing the open end of the tube, a compressible, resilient, insulating bushing interposed between and having sealing contact with the tube and cap, a mass of mercury shiftable to make and break the circuit between said tube and cap, and a refractory insert over which the circuit is made and broken carried by said bushing.

3. In a mercury switch, the combination of a metallic tube closed at one end, a metallic cap for closing the open end of the tube, a compressible, resilient, insulating bushing interposed between and having a sealing contact with the tube and cap, said bushing having a shoulder for axially spacing the tube and cap, a mass of mercury shiftable to make and break the circuit between said tube and cap, and a refractory insert over which the circuit is made and broken carried by said bushing.

4. In a mercury switch, the combination of a metallic tube closed at one end, a metallic cap for closing the open end of the tube, a compressible, resilient, insulating bushing interposed between and having sealing contact with the tube and cap, said cap, bushing and tube being successively nested within each other, a mass of mercury shiftable to make and break the circuit between said tube and cap, and a refractory insert over which the circuit is made and broken carried by said bushing.

5. In a mercury switch, the combination of a metallic tube closed at one end, and means for closing the opposite end comprising a compressible, resilient insulating member and an electrode device separated from the tube by said member and adapted to compress the member against the tube whereby said member forms a sealing connection between the tube and device, a mass of mercury shiftable to make and break the circuit between said tube and electrode device, and a refractory insert over which the circuit is made and broken carried by said member.

6. In a mercury switch, the combination of a metallic tube closed at one end, a bushing of compressible, resilient, insulating material exteriorly engaging the open end of the tube and having a portion extending beyond said open end, a metallic cap compressibly engaging the exterior of the bushing whereby the bushing sealably connects the tube and cap, a mass of mercury shiftable to make and break the circuit between said tube and cap, and a refractory insert over which the circuit is made and broken carried by said bushing portion.

7. In a mercury switch, the combination of a metallic tube closed at one end and having an external shoulder, a bushing of compressible, resilient, insulating material exteriorly engaging the open end of the tube and having a collar abutting against said shoulder, a metallic cap compressibly engaging the exterior of the bushing and having a chamber communicating with the opening through the bushing, said tube and cap being axially spaced by said collar, a mass of mercury shiftable to make and break the circuit between said tube and cap, and a refractory insert over which the circuit is made and broken carried by said bushing.

8. In a mercury tube switch, the combination of a two part, metallic container, each part constituting an electrode of the switch, a resilient, insulating bushing sealably connecting the container parts, a mass of mercury shiftable to make and break the circuit between said parts, and a refractory insert over which the circuit is made and broken carried by said bushing.

9. In a mercury tube switch, the combination of a metallic container tube closed at one end, means for closing the opposite end comprising a metallic cap and a compressible, insulating member sealably interposed between said tube and cap, a mass of mercury shiftable to make and break the circuit between said tube and cap, and a refractory insert over which the circuit is made and broken carried by said member.

10. In a mercury tube switch, the combination of a tube closed at one end, a compressible, resilient bushing circumferentially engaging the open end of the tube for an appreciable length thereof, electrode means for retaining the bushing in position, said bushing forming a sealing contact with the electrode and the tube, a mass of mercury shiftable to make and break the circuit between said tube and electrode, and a refractory insert over which the circuit is made and broken carried by said bushing.

11. In a mercury switch, the combination of a metallic tube closed at one end, a metallic cap for closing the open end of the tube, a compressible, resilient, insulating bushing interposed between and having sealing contact with the tube and cap, said bushing having a collar for axially spacing the tube and cap and a portion extending beyond the open end of the tube, a refractory insert mounted on said portion, and a mass of mercury shiftable to make and break the circuit between the tube and cap over the insert.

12. In a mercury switch, the combination of a metallic tube closed at one end and having a reduced portion adjacent the open end thereof, the junction of the reduced portion with the remainder of the tube forming a shoulder, a compressible, resilient, insulating bushing fitting over said reduced portion and having a collar abutting said shoulder and a portion extending beyond the open end of the tube, a metallic cap closing the open end of the tube and compressibly fitting over said bushing to cause the latter to form a seal with the tube and cap, a refractory insert mounted on said portion, and a mass of mercury shiftable to make and break the circuit between the tube and cap over the insert.

13. In a mercury switch, the combination of a metallic tube closed at one end and having a reduced portion adjacent the open end thereof, the junction of the reduced portion with the remainder of the tube forming a shoulder, a compressible, resilient, insulating bushing fitting over said reduced portion and having a collar abutting said shoulder and a portion extending beyond the end of the tube, a metallic cap closing the open end of the tube and compressibly fitting over said bushing to cause the latter to form a seal with the tube and cap, the end edge of the cap abutting said collar, a refractory insert mounted on said portion, and a mass of mercury shiftable to make and break the circuit between the tube and cap over the insert.

14. In a mercury switch, the combination of a metallic tube closed at one end, a metallic cap for closing the open end of the tube, and a compressible, resilient insulating bushing interposed between and having sealing contact with the tube and cap, said bushing having a collar for axially spacing the tube and cap, and said collar, tube and cap having substantially the same dimensions transversely of the switch.

15. In a mercury switch, the combination of a metallic tube closed at one end and having a reduced portion adjacent the open end thereof, the junction of the reduced portion with the remainder of the tube forming a shoulder, a compressible, resilient, insulating bushing fitting over said reduced portion and having a collar abutting said shoulder and a metallic cap closing the open end of the tube and compressibly fitting over said bushing to cause the latter to form a seal with the tube and cap.

16. In a mercury switch, the combination of a metallic tube closed at one end and having a reduced portion adjacent the open end thereof, the junction of the reduced portion with the remainder of the tube forming a shoulder, a compressible, resilient, insulating bushing fitting over said reduced portion and having a collar abutting said shoulder, and a metallic cap closing the open end of the tube, the end edge of the cap abutting said collar and said cap compressibly fitting over said bushing to cause the latter to form a seal with the tube and cap.

17. In a mercury switch, the combination of an open ended metallic tube having a collar intermediate the ends thereof, a compressible, resilient insulating bushing fitting over each end of the tube, and a metallic cap closing each open end and compressibly fitting over the associated bushing in axially spaced relation to said collar to cause the bushing to form a seal with the tube and co-operating cap.

18. In a mercury tube switch, having a pair of metallic electrodes forming a chamber therebetween, mercury in the chamber, an insulating bushing compressed between the electrodes to form a seal therebetween, and a separate breaker between the electrodes carried on the bushing.

In testimony whereof I affix my signature.

JOSEPH H. STALEY.